United States Patent
Kamijo

(10) Patent No.: US 7,267,699 B2
(45) Date of Patent: Sep. 11, 2007

(54) FUEL PROCESSING SYSTEM FOR REFORMING HYDROCARBON FUEL

(75) Inventor: Motohisa Kamijo, Kanagawa (JP)

(73) Assignee: Nissan Motor Co., Ltd., Kanagawa-Ken (JP)

( * ) Notice: Subject to any disclaimer, the term of this patent is extended or adjusted under 35 U.S.C. 154(b) by 442 days.

(21) Appl. No.: 10/714,855

(22) Filed: Nov. 18, 2003

(65) Prior Publication Data

US 2005/0102902 A1    May 19, 2005

(51) Int. Cl.
*C10K 3/06* (2006.01)
*B32B 5/02* (2006.01)
*B01J 19/00* (2006.01)

(52) U.S. Cl. .................. 48/214; 48/215; 48/214 A; 48/197 R; 48/127.9; 48/128; 48/198.3; 422/105; 422/108; 422/110; 422/112; 422/116; 422/129; 422/198; 429/19; 429/20; 423/648.1; 423/650; 423/651

(58) Field of Classification Search ................ 422/198, 422/194, 189, 188, 187, 172
See application file for complete search history.

(56) References Cited

U.S. PATENT DOCUMENTS

| | | | |
|---|---|---|---|
| 4,222,351 A | 9/1980 | Kosaka et al. | |
| 5,624,964 A * | 4/1997 | Cimini et al. | 518/704 |
| 6,413,661 B1 | 7/2002 | Clingerman et al. | |
| 2002/0031690 A1 | 3/2002 | Shimazu et al. | |
| 2002/0106538 A1 * | 8/2002 | Lenglet et al. | 429/17 |
| 2002/0150532 A1 | 10/2002 | Grieve et al. | |
| 2003/0200742 A1 * | 10/2003 | Smaling | 60/275 |
| 2004/0079031 A1 * | 4/2004 | Seaba et al. | 48/127.9 |
| 2004/0098977 A1 * | 5/2004 | Kupe et al. | 60/286 |

FOREIGN PATENT DOCUMENTS

JP    2002-012406    1/2002

* cited by examiner

*Primary Examiner*—Glenn Caldarola
*Assistant Examiner*—Kaity V. Handal
(74) *Attorney, Agent, or Firm*—McDermott Will & Emery LLP

(57) ABSTRACT

A fuel processing system including a filter for reforming a hydrocarbon fuel and its operation is disclosed. The system includes a first chamber for receiving a hydrocarbon fuel and combining it with air or water; a reformer in fluid connection with and down stream of the first chamber, which receives the hydrocarbon fuel combined with either air or water to reform the fuel to a reformate stream, which contains a hydrogen rich atmosphere; a second chamber in fluid connection with the reformer which is capable of receiving the reformate stream from the reformer; a water inlet connected to the second chamber capable of introducing water to the reformate stream; and a filter in fluid connection with and down stream of the second chamber, which is capable of preventing a substantial portion of any solid particles contained in the reformate stream from passing therethrough. The filter can be regenerated by introducing water as an oxidant to the reformate stream to oxidize any collected soot on the filter in the hydrogen rich atmosphere of the reformate stream.

15 Claims, 8 Drawing Sheets

FUEL PROCESSING SYSTEM FOR REFORMING HYDROCARBON FUEL

FIELD OF THE INVENTION

The invention relates to a fuel process system that includes a filter to trap soot and the operation of the system to reduce the amount of trapped soot at any given time.

Fuel cells have been developed as alternative power sources such as for electrical vehicles. A fuel cell is a demand-type power system in which the fuel cell operates in response to the load imposed across the fuel cell. Typically, a hydrocarbon fuel such as gasoline, methanol, diesel, naphtha, etc. serves as a fuel supply for the fuel cell. During operation, the hydrocarbon fuel is reformed to a gaseous stream containing hydrogen. The conversion is usually accomplished by passing the fuel through a fuel reformer to convert the fuel to a hydrogen gas stream. The hydrogen is then used by the fuel cell to generate electricity, which can power a motor vehicle.

In a gasoline reformation process, steam, air and gasoline are reacted in a fuel processor, which typically contains two sections. One is primarily a partial oxidation reactor and the other is primarily a steam reformer. The fuel processor produces hydrogen, carbon dioxide, carbon monoxide and water. Down stream reactors such as water/gas shift (WGS) and preferential oxidizer (PROX) reactors are used to produce carbon dioxide from carbon monoxide using oxygen from air as an oxidant.

A typical problem in such fuel reforming systems is the generation of soot within the system, which can contaminate catalysts and other system components thereby adversely affecting the system's operation. To prevent soot related problems, a filter can be used to collect any soot resulting from the reformation process. The removal of such soot raises other issues with these systems however.

JP 2002-012406 discloses a fuel reforming apparatus that collects soot in a filter down stream of a reformer and subsequently burns the collected soot by a process that includes the step of increasing air to the system at set intervals. However, the burning of trapped soot by air generates heat which can exceed 1000° C. locally within the filter. Moreover, since the atmosphere during operation of the system is concentrated in carbon oxides and hydrogen, an excess amount of air, which includes an excess amount of oxygen, is needed to burn the trapped soot. This is because the gaseous components in the filter atmosphere burn more readily than the solid soot. This excess oxygen can adversely affect other components down stream, particularly components sensitive to a high-temperature oxygen laden atmosphere, such as catalysts.

Accordingly, the efficient elimination of collected soot trapped by a filter is desired without some or all of the noted adverse affects of removing the trapped soot.

SUMMARY OF THE INVENTION

An advantage of the present invention is an apparatus and process for the elimination of trapped soot in a fuel processing system that minimize adverse affects of soot removal by oxidizing soot trapped on to a filter during the reformation process.

These and other advantages are satisfied, at least in part, by a fuel processing system for reforming a hydrocarbon-based fuel that includes a filter for collecting soot during the reforming process. The system comprises a first vaporization zone for receiving the hydrocarbon fuel and combining it with air and/or water. The hydrocarbon fuel can be those that are known in the art such as gasoline, methanol, propane, etc. The apparatus also includes a reformer in fluid connection and down stream of the first vaporization zone. The reformer is capable of receiving the hydrocarbon fuel combined with either air or water and reforming the fuel to a reformate stream. This stream contains several components including hydrogen, carbon oxides, such as carbon monoxide and carbon dioxide, unoxidized hydrocarbon fuel, partially oxidized hydrocarbon fuel, and possibly particulate contaminates, e.g., soot, among other components. The unoxidized hydrocarbon components in the reformate stream can be in solid or in semi-solid form and, if permitted to continue with the reformats stream, would adversely affect the operation of the fuel system. A second vaporization zone is included in the fuel processing system which is in fluid connection with the reformer and capable of receiving the reformate stream from the reformer and mixing it with air or water. A filter is also included in the system in fluid connection with and down stream of the second vaporization zone, which is capable of preventing a substantial portion of any soot contained in the reformate stream from passing therethrough. Advantageously the system is adapted to oxidize any soot collected on the filter during the reformation process, e.g., in the hydrogen atmosphere of the reformate stream.

Embodiments of the apparatus include an oxidizing catalyst downstream of the filter to reduce the amount of any oxygen in the reformate stream; a pressure gage connected to the system for measuring the pressure loss across the filter to estimate the amount of soot collected on the filter; a third vaporization zone down stream of the filter which is capable of introducing water to the reformate stream passing through the filter and thus lowering the temperature of the reformate stream; and a temperature sensor connected to the system to detect the temperature of the reformate stream in the third vaporization zone and/or prior to the inlet of the stream to a water gas shift reactor.

Another aspect of the present invention includes a process for operating a fuel processing system as, for example, in an automobile fuel cell, which minimizes the adverse effects of soot collected on a filter in the system. The process comprises combining a hydrocarbon fuel with air to form a fuel-air mixture; reforming the mixture to a reformate stream which contains a hydrogen rich atmosphere; passing the reformate stream through a filter to collect any soot therein on a filter; and, when a predetermined amount of soot has collected on the filter, introducing at least water to the reformate stream between the reformer and the filter for a set period of time to remove the soot collected on the filter. The water introduced to the reformate stream prior to the filter advantageously oxidizes soot collected on the filter in the reducing atmosphere of the reformate stream without completely oxidizing the reformate stream.

Embodiments of the present process include oxidizing trapped soot at predetermined set intervals based upon empirical analysis of the historical operation of the system; estimating the amount of soot built-up in the filter by determining a predetermined pressure deferential across the filter indicative of soot on the filter; and performing operations to combust and/or oxidize soot. Additional embodiments include detecting the temperature of the reformate stream immediately after the filter and, if necessary, lowering the temperature of the reformate stream by introducing water into the stream prior to a water gas shift reactor inlet.

Additional advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

The various features and advantages of the present invention will become more apparent and facilitated by reference to the accompanying drawings, submitted for purposes of illustration and not to limit the scope of the invention, where the same numerals represent like structure and wherein.

DESCRIPTION OF THE INVENTION

The present invention stems from the discovery that reforming hydrocarbon based fuels can lead to the development or formation of non-gaseous particles, such as unreacted or partially reacted hydrocarbon particles, i.e. generally referred to as soot, and that the oxidation of the soot can be accomplished during the reforming process and under the reducing atmosphere of the reformate stream by adding water as an oxidant to combust or oxidize the soot collected on a filter. As noted in the background section, air has been used to oxidize soot collected on a filter. However, the sole introduction of air has potential deleterious effects as noted in the background section.

Generally, the present invention applies to a fuel processing system for a fuel cell. A fuel cell relies on hydrogen for power which can be produced in a fuel processing system by reforming hydrocarbon fuels. During this process, soot can be generated which adversely effects various components in the system. In a preferred aspect of the present invention any soot generated during the reforming process is oxidized and/or burned and thus eliminated while the system is reforming the hydrocarbon fuel.

In a fuel cell, a reformer is provided which is effective to reform hydrocarbon fuels into a hydrogen rich fuel for introduction into the fuel cell. Typically, a reformer is combined with a shift reaction section to perform a water gas shift reaction for further conversion. In the water gas shift reaction, the hydrogen rich gas streaming coming from the reformer is reacted with water to shift the carbon monoxide in the gas to hydrogen and carbon dioxide, and thereby increase the hydrogen content of the hydrogen rich gas. By way of example, figures are provided which illustrate various embodiments of the present invention.

Figure 1:
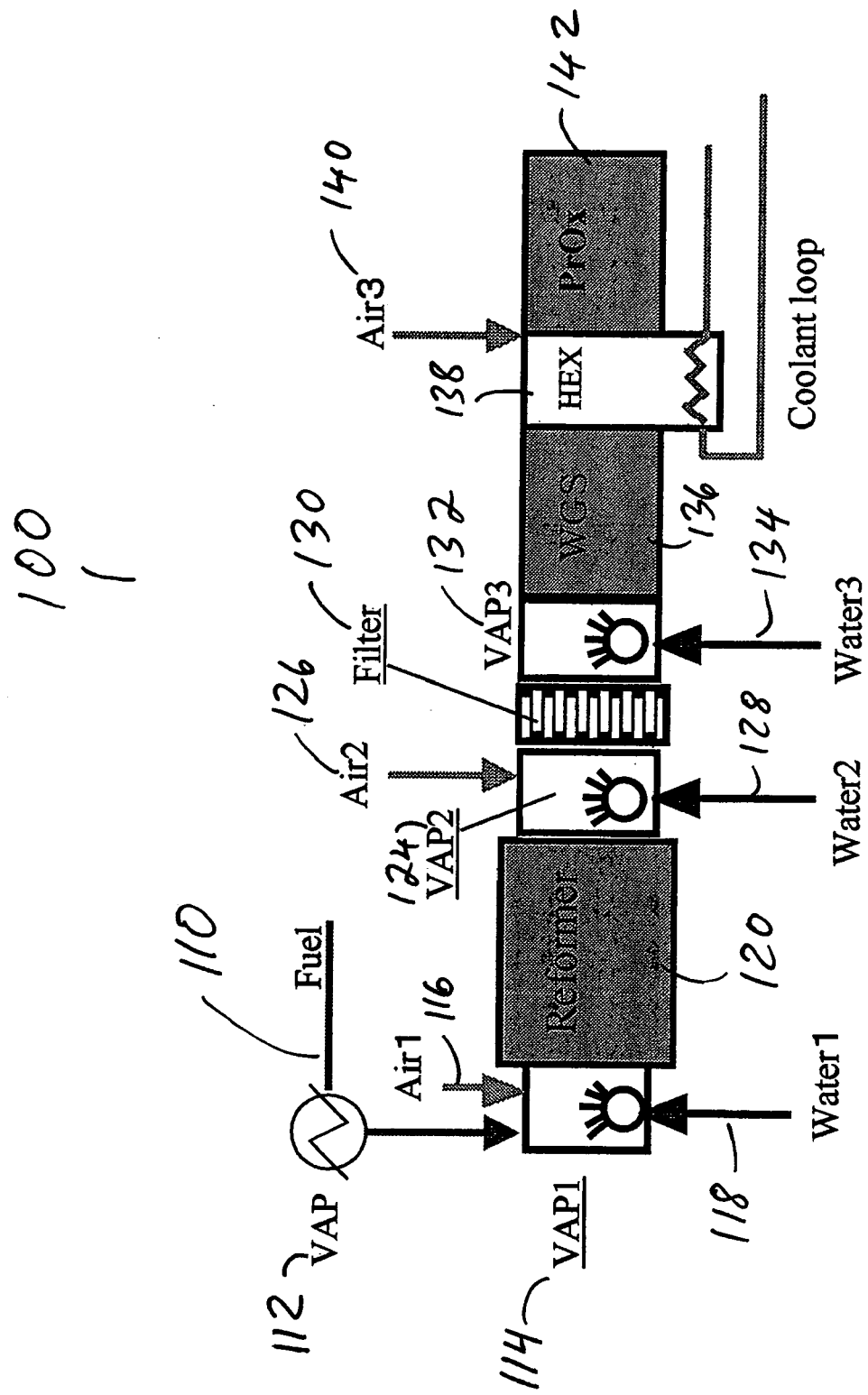
FIG. 1 is a block diagram schematically depicting the structure of one embodiment of a fuel processing system of the present invention.

FIG. 1 shows an example of a fuel processing system. This system illustrates several components of a fuel cell. The system may be used in a vehicle (not shown) as an energy source for vehicle propulsion. In the system, a hydrocarbon is processed in a fuel processor, for example, by reformation and preferential oxidation processes, to produce a reformate gas which has a relatively high hydrogen content on a volume or molar basis.

The invention is hereafter described in the context of a fuel cell fueled by an $H_2$-rich reformate stream without regard by which such reformate is made. It is to be understood that the principles embodied herein are applicable to fuel cells fueled by $H_2$ obtained from any source, including reformable hydrocarbons and hydrogen-containing fuels such as methanol, ethanol, gasoline, alkene, or other aliphatic or aromatic hydrocarbons in liquid or gaseous forms.

As shown in FIG. 1, a fuel processing system 100 includes reformer 120 for catalytically reacting a reformable hydrocarbon fuel introduced at inlet 110, and water in the form of steam from a water inlet 118. In some fuel processors, air is also used. In this case, the system also receives air from inlet 116. Prior to entering the reformer, fuel, water and air, if applicable, are mixed in vapor chamber 114. In the case of a liquid hydrocarbon fuel, vaporizer 112 can be employed to vaporize the fuel prior to entering the reformer. Vaporizer chamber 114 aids in mixing the fuel and other components prior to entering reformer 120. The reformable hydrocarbon fuel then undergoes dissociation in the presence of water/ steam and sometimes air to produce a hydrogen-rich reformate stream (not shown).

The fuel processing system also typically includes one or more down stream reactors, such as water/gas shift (WGS) 136 and preferential oxidizer (PROX) reactor 142 which are used to produce carbon dioxide from carbon monoxide. Heat exchanger 138 can also be included in the apparatus to cool the gases coming from WGS 136. Preferably, the initial reformats stream which comprises hydrogen, carbon dioxide, carbon monoxide (CO) and water is further treated in a preferential oxidation (PROX) reactor 142 to reduce the CO-levels therein to acceptable levels, for example, below 20 ppm. Then, during run mode, the $H_2$ rich reformate (not shown) is fed through a valve into the anode chamber of a fuel cell stack. At the same time, oxygen (e.g., air) from an oxidant stream is fed into the cathode chamber of the fuel cell stack. The hydrogen from the reformate stream and the oxygen from the oxidant stream reaction in the fuel cell are then used to produce electricity.

In addition to hydrogen, the reformate stream contains non-gaseous components such as incomplete or partially oxidized hydrocarbons or carbon particles. These components are primarily carbon-based solids and are generally referred to as soot. When using a reforming apparatus, it is usually difficult to prevent the generation of soot completely. Under normal operating conditions, there is little difficulty in maintaining an ideal fuel, water, and/or air mixture because the amounts of these components can be predetermined to generate a minimum amount of soot. However, when the flow rates need to be varied due to a variation in the load across the fuel cell, there is a time lag between the optimal amount of components in the mixture and the flow rates needed to achieve that optimum mixture. Thus, the proportions of fuel, water, and/or air are less than ideal and soot tends to form.

Figure 7:
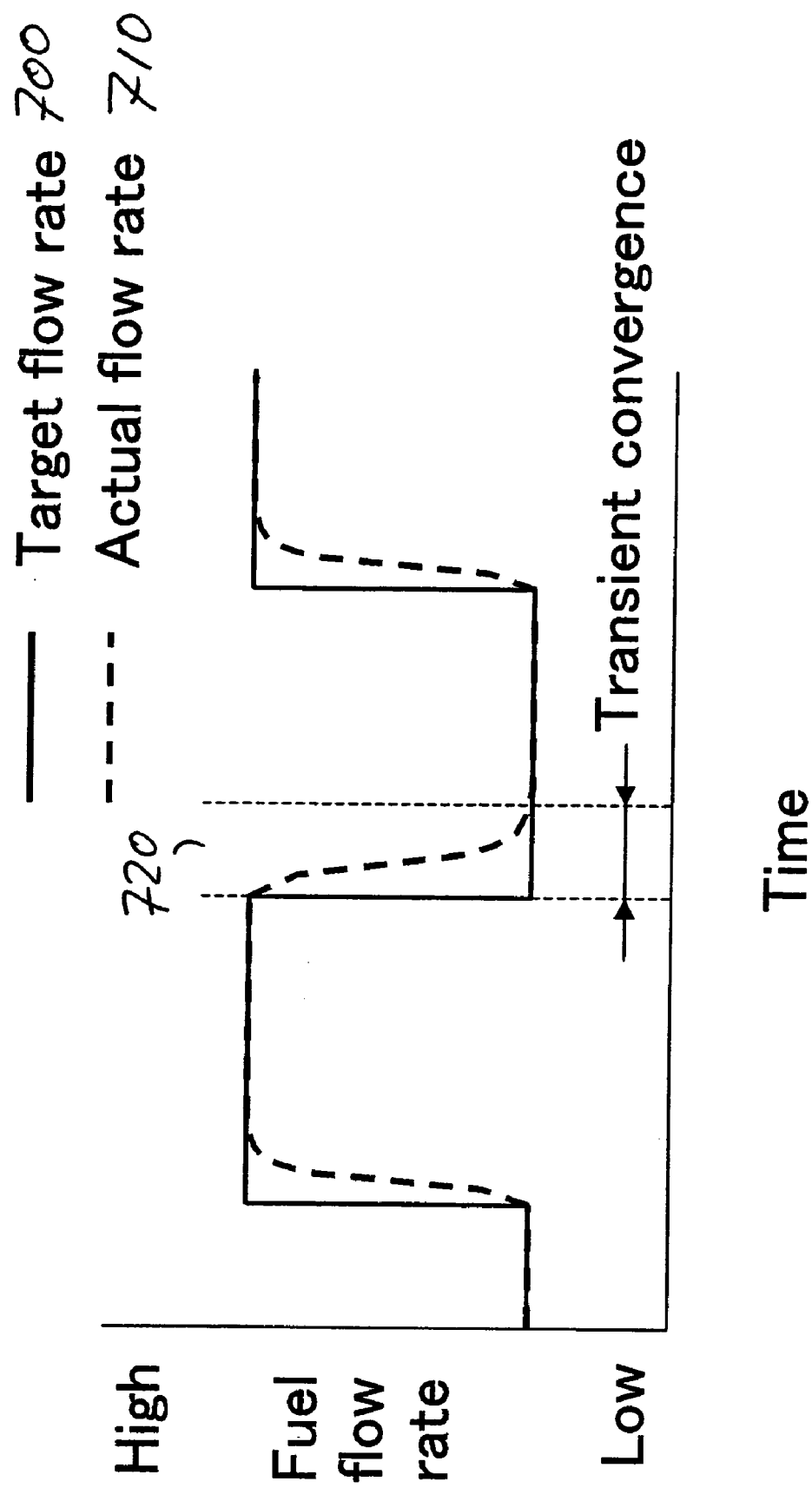
FIG. 7 is a chart showing the expected time lag between target values and actual values of fuel, air, and water inputs in the operation of a fuel cell.

For example, FIG. 7 illustrates flow rates of fuel and oxidants to a reformer in a fuel cell under load. As shown a target flow rate, indicated by a solid line 700, is charted together with the actual flow rates of fuel, air and water introduced in a reformer. The difference between the target flow rates 700 and the actual flow rates 710, is shown by element 720 and is proportional to the time lag between the demand for power and the response of the system.

As shown in FIG. 1, the output of any soot generated during the hydrocarbon reforming process is collected onto filter 130 which is in fluid connection with and down stream of reformer 120. The soot collected on the filter can be advantageously eliminated or reduced by oxidizing the soot in the reducing atmosphere of the reformate stream by the introduction of water. As shown in FIG. 1, water inlet 128 is introduced between reformer 120 and filter 130 in a second vaporization zone 124 with or without air from inlet 126. In addition, the filter can be regenerated by increasing the quantity of water which is introduced through inlet 118 together with inlet 128. The increased quantity of water added up to the pre-filter stage of the reforming process makes it possible to eliminate soot in the filter as shown by the reactions in formulas 1 and 2 below.

$$C + H_2O \rightarrow H_2 + CO— \qquad \text{Formula 1}$$

$$C + 2H_2O \rightarrow 2H_2 + CO_2— \qquad \text{Formula 2}$$

Under normal operating conditions, the quantity of water introduced at inlet 118 is only the amount necessary for the reformation reaction of hydrocarbon fuel introduced at inlet 110. Also the quantity of water introduced at 128 and 134 is only the amount necessary for the WGS 136 reactor. If air is introduced through inlet 126 it oxidizes components in the reformate stream according to the following equations.

$$H_2 + \tfrac{1}{2}O_2 \rightarrow H_2O— \qquad \text{Formula 3}$$

$$CO + \tfrac{1}{2}O_2 \rightarrow CO_2— \qquad \text{Formula 4}$$

By introducing air in the second vaporization zone 124, an exothermic reaction results which aids in maintaining the temperature of the inlet gases of filter 130 at approximately 900° C. or higher. This, in turn, aids the reactions shown in formulas 1 and 2. Adding air and water to regenerate filter 130 permits the oxidation of any soot collected on filter 130 to be eliminated without the reformed gas at the stage before WGS reactor 136 having excess oxygen. Consequently, WGS 136 is not exposed to a high temperature gas stream that contains an excess amount of oxygen which, in turn, prevents deterioration of this reactor. In addition, water from inlet 134 can be used to reduce the temperature of the reformate gas exiting the filter into chamber 132 either during normal operation or to reduce the temperature of the outlet gases during the regeneration of the filter.

Figure 2:
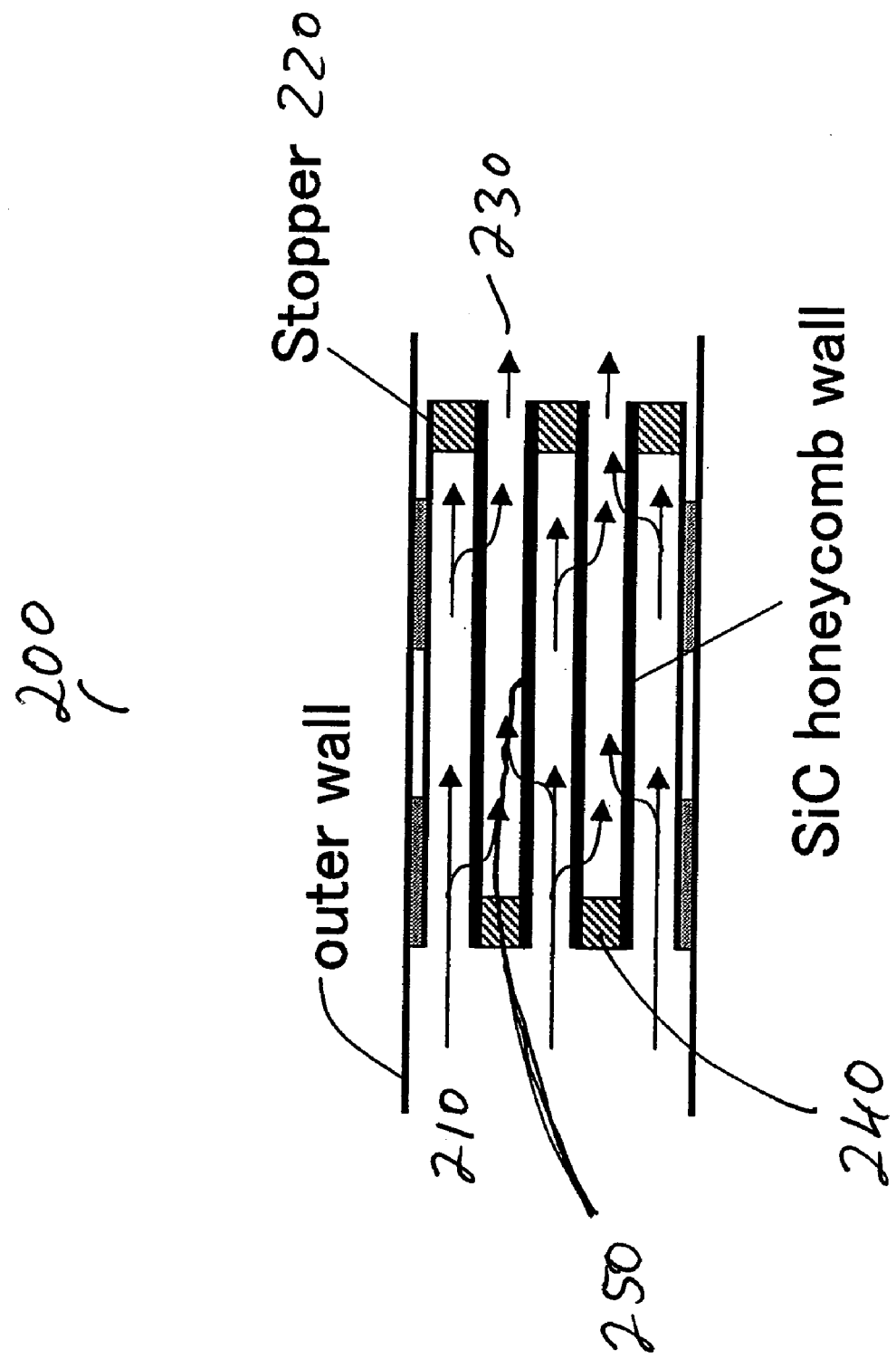
FIG. 2 is a diagram illustrating the structure of a filter that can be employed in the present invention.

The present inventive apparatus can employ any filter known in the art to trap soot in a fuel processing system. The filter can comprise materials and structures as known in the art, such materials and structures including silicon carbide (SiC), cordierite, and ceramic fiber, with cavities having an effective diameter of about 10 to about 100 μm and a heat resistance of 1000° C. or more. In one embodiment, FIG. 2 shows the structure of a honeycomb filter that can be used in accordance with the present invention. Therein, honeycomb filter 200 is composed of a porous material with multiple cavities. Raw gas supply passage 210 is composed of one in every two alternate cells, having its down stream end closed with stopper 220, and filtered gas passage 230 is composed of each remaining alternate cell, having its upstream end closed with stopper 240. The surface of partition 250 can contain a reform catalyst on the side of the filtered gas passage 230.

When raw gas containing hydrocarbon fuel is supplied to reformer 120, as shown in FIG. 1, and filtered through honeycomb filter 200, illustrated in FIG. 2, soot contained in the raw gas is trapped in the cavities and surface of partition 250, and hydrocarbon fuel is converted to reformed gas containing hydrogen and carbon monoxide in the presence of the reform catalyst.

Figure 3:
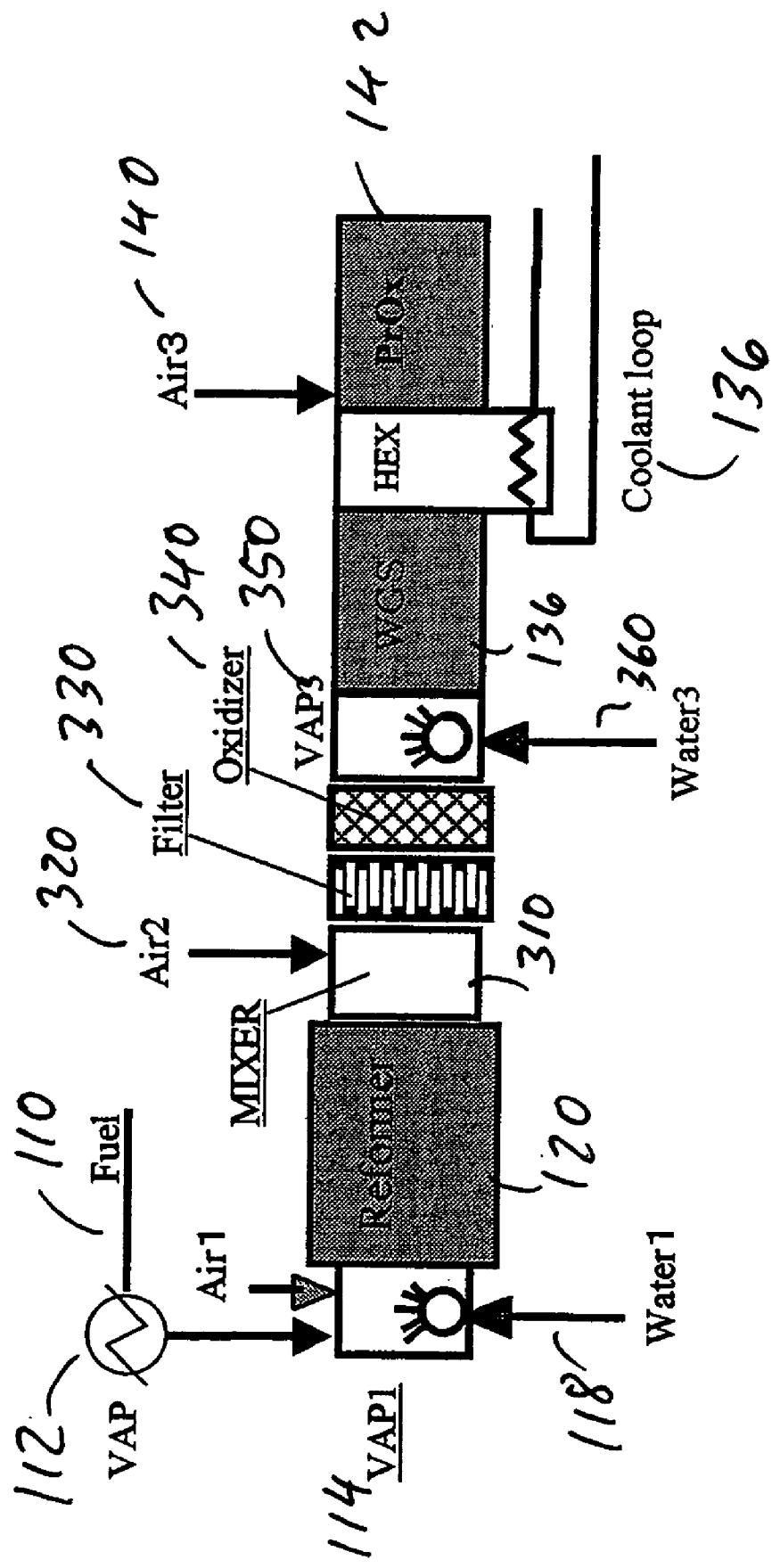
FIG. 3 is another block diagram showing the structure of another embodiment of the fuel cell processing system of the present invention, which includes an oxidizing component.

In another embodiment of the present invention, FIG. 3 shows a fuel processing system which includes many of the elements shown in FIG. 1 and also includes an oxidizer catalyst. In this embodiment, fuel, water, and/or air are mixed in first vaporization zone 114, reacted in reformer 120 to generate a reformate stream (not shown) which is passed through filter 330 to collect non-gaseous components in the stream onto the filter. As shown in FIG. 3, air from inlet 320 is introduced to the reformate stream in a mixing zone 310 prior to filter 330. By this method any carbon-based components that have collected on filter 330 can be oxidized in accordance with reactions shown formulas 5 and 6.

$$C + \tfrac{1}{2}O_2 \rightarrow CO— \qquad \text{Formula 5}$$

$$C + O_2 \rightarrow CO_2— \qquad \text{Formula 6}$$

Any non-reacted oxygen is then consumed down stream by oxidizing catalyst 340 by the reactions shown in formulas 3 and 4. In this manner, the reformate stream exiting oxidizer 340 into vaporization zone 350 is free of excess oxygen which would adversely affect WGS reactor 136. FIG. 3 also shows a water inlet 360 which can introduce water vapor into vaporization zone 350 and to the reformate stream as necessary. The remaining components of FIG. 3 are as described in FIG. 1.

Figure 4:
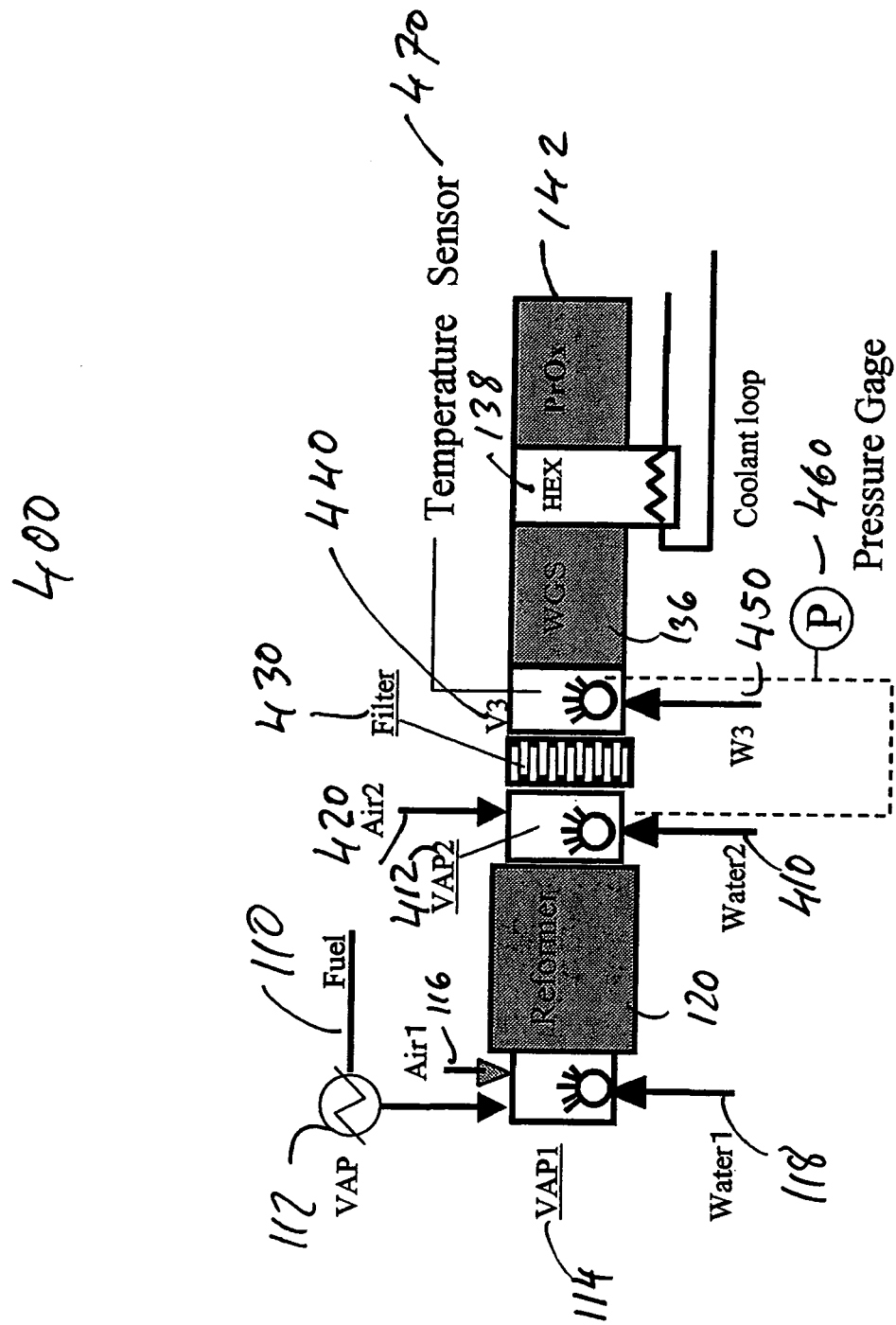
FIG. 4 is another block diagram schematically depicting the structure of another embodiment of the inventive fuel cell processing system, which includes a pressure gage.

In another aspect of the present invention, FIG. 4 shows a fuel processing system that includes a pressure gage to measure the pressure differential across a filter to aid in determining the optimum time of regenerating the filter. As shown in FIG. 4, fuel, water, and/or air are mixed in vaporization chamber 114 and introduced to reformer 120 to generate a reformate stream (not shown). Additionally, water from inlet 410 and/or air from inlet 420 can be mixed with the reformate stream in vaporization chamber 412 prior to filter 430 to regenerate the filter. A separate vaporization chamber 440 having water inlet 450 is also provided to reduce the temperature of outlet gases exiting filter 430, if necessary, prior to reaching WGS 136.

A pressure gage 460 is also included in this embodiment which can measure the pressure upstream and down stream at filter 430. The pressure gage, a computer or sensor can then calculate the pressure loss or differential across the filter. Through experimentation, it can be determined at what pressure drop the filter is most advantageously regenerated. At that time, water from water inlet 410 can be added and water from inlet 118 can be increased along with air from air inlet 420 to reduce or eliminate the non-gaseous components that have collected on filter 430.

The system of FIG. 4 also includes temperature sensor 470 for vaporization zone 440. The temperature sensor can be used to detect the temperature of the reformate stream exiting filter 430 and when the temperature of the reformate stream reaches a particular value as, for example, when the filter is being regenerated, water from inlet 450 can be introduced to vaporization zone 440 to reduce the temperature of the reformate stream entering WGS reactor 136.

Figure 5:
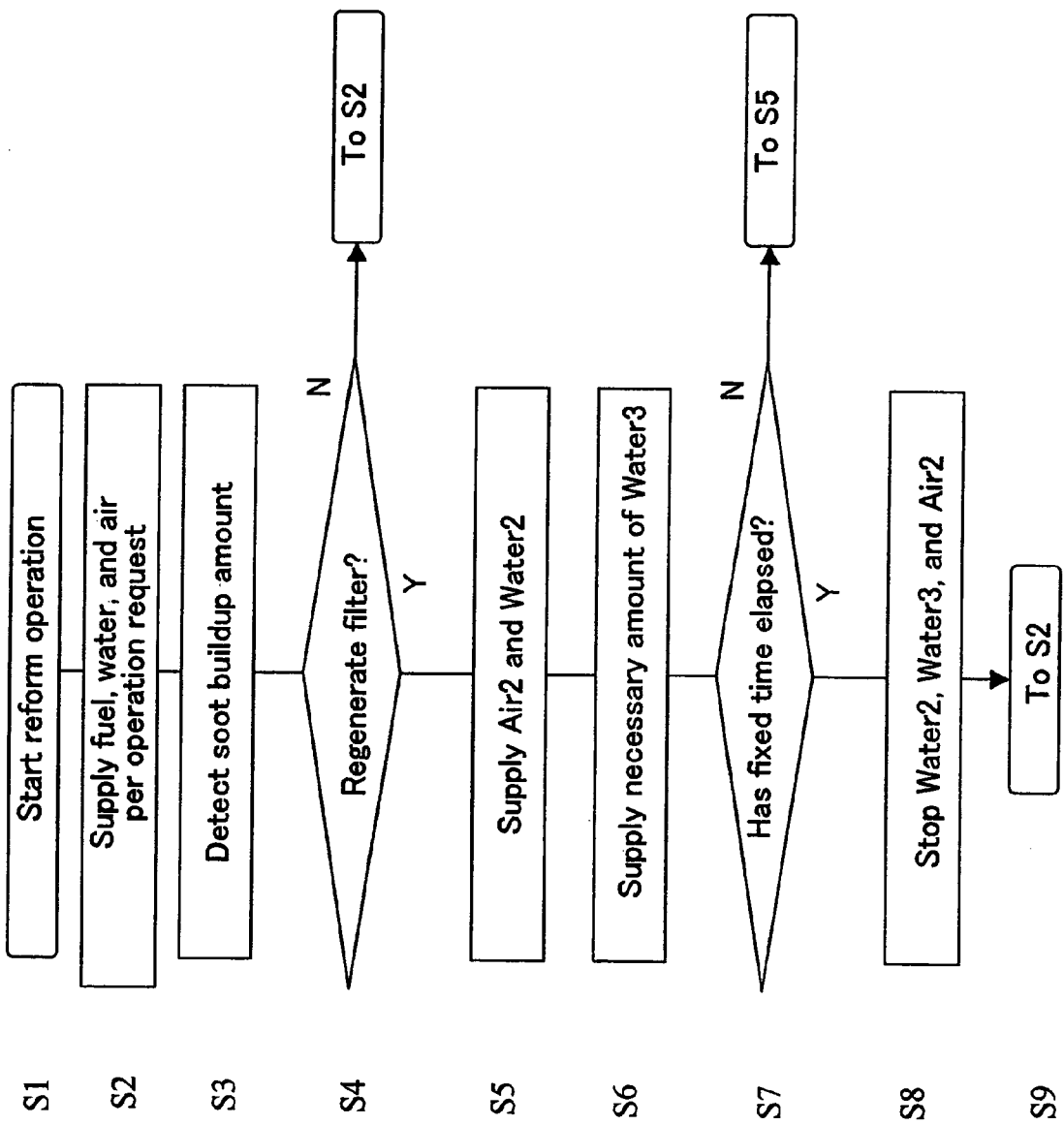
FIG. 5 is a flowchart showing the operation of the fuel cell processing system in accordance with one aspect of the present invention.

The operation of the fuel processing system with the filter function is illustrated in FIG. 5. As understood by those skilled in the art, the operation of a fuel processing system in accordance with the present invention can be controlled by a computer for optimum results in operation.

Reference is now made to FIG. 5 which is a flow sheet illustrating operation of one embodiment of the reforming system of this invention, including use of a filter. Generally a fuel processing system includes a reformer; vaporization zones or mixing zones; fuel, air, water inlets, and a filter. Pressure gages and temperature gages can also be employed in operation. The fuel can be gasoline, but as is well known in the art, other fuels can be reformed to form hydrogen gas in such reformer reactions. Typical fuels include gasoline, methanol, diesel, and naphtha, all of which are well known. Fuels are typically used which can be subjected to a reformer reaction to produce a mixture containing sufficient hydrogen to serve as fuel for a fuel cell.

In an embodiment of the present invention, as shown in FIG. 5, fuel, water, and/or air are supplied in accordance with an operation request from the fuel cell. Fuel can be vaporized and then added by an injector, water can be added by a water pump, and air can be added by a blower.

As seen in FIG. 5, and with reference to FIG. 3, start-up operation begins at S1 where fuel, water and air are supplied to a reformer per operation request at S2. At S3, soot is captured on the filter and the amount that is collected is determined. This determination can be made either from prior empirical testing so that a predetermined time of operation would trigger a regeneration of the filter operation or through actual detecting or monitoring of the pressure loss across the filter or by determining the time lag between a request for hydrogen by the fuel cell in the reformate stream and the actual time when hydrogen is available.

Figure 6:
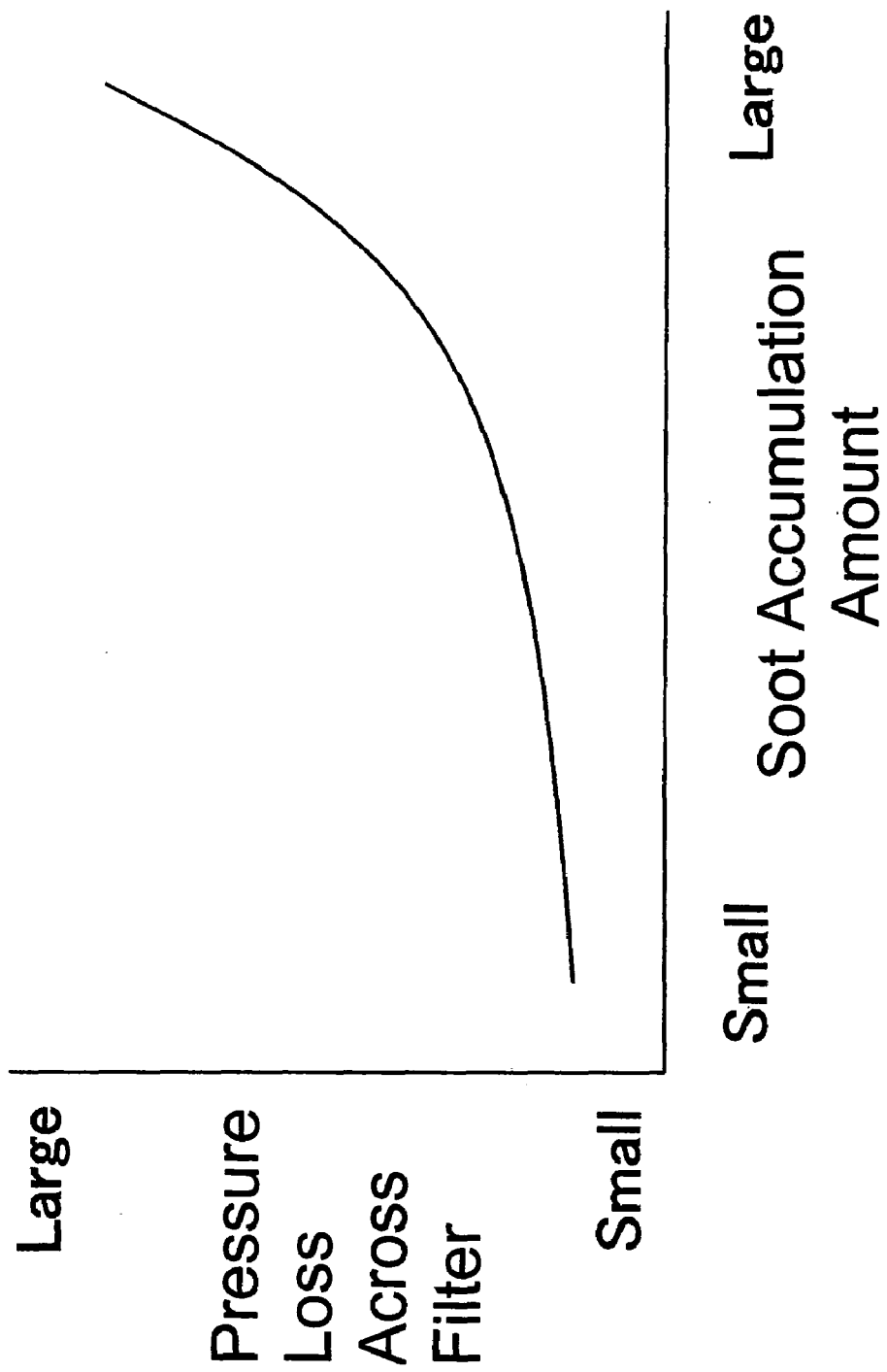
FIG. 6. is a chart depicting the relationship of the pressure loss across a filter and a fuel processing system for a given amount of soot that can build up on the filter.

In FIG. 6, a chart showing the pressure loss across the filter as detected by a differential pressure gage located upstream and down stream of the filter. The chart can be generated by empirical data where the amount of soot built-up can be correlated to the pressure loss across the filter. It can also be determined that at a certain pressure, the filter needs to be generated and this information can be inputted into a computer and the regeneration operation undertaken when the pressure loss reaches that predetermining value.

In practicing another embodiment of the present invention, a determination as to whether the filter needs to be regenerated can be determined from measuring the time lag between target values and actual values. For example, FIG. 7 shows a chart where the target flow rate, indicated by a solid line 700, is charted together with the actual flow rates of fuel, air and water introduced in a reformer. The difference between the target flow rates 700 and the actual flow rates 710, shown by element 720 in the chart, can be used to determine when the regeneration process needs to be undertaken. For example, when element 720 increases to a predetermine value, regeneration of the filter can take place. For example, in one example of practicing the present invention, gasoline fuel is vaporized in a vaporizer and then added by an injector. Water is added by a water pump and air is added by a blower. The response to the fuel vaporization, however, is the slowest. As a result, soot tends to be generated until the target value of the components is reached. Thus, if the average speed of soot generation in transient convergent time is determined by low variation testing before hand, the soot generation amount can be captured by integrating the generation amount when transient operation is performed under actual control, in accordance with duration or transient operation.

At S4, in FIG. 5, the regeneration operation is judged whether it needs to be carried out. In other words, S4 is judged whether the predetermined soot build-up amount has been exceeded. If filter regeneration at S4 is not necessary, normal operation is performed at S2. If filter regeneration is necessary, water or steam can be introduced to the reformate stream exiting the reformer prior to the filter S5. The water supply amount is provided which is necessary to eliminate soot from the filter as shown by the reactions in formulas 1 and 2. This can be determined by previous testing. Air can also be introduced to increase the temperature of the reformate stream entering the filter as shown in formulas 3 and 4.

Figure 8:
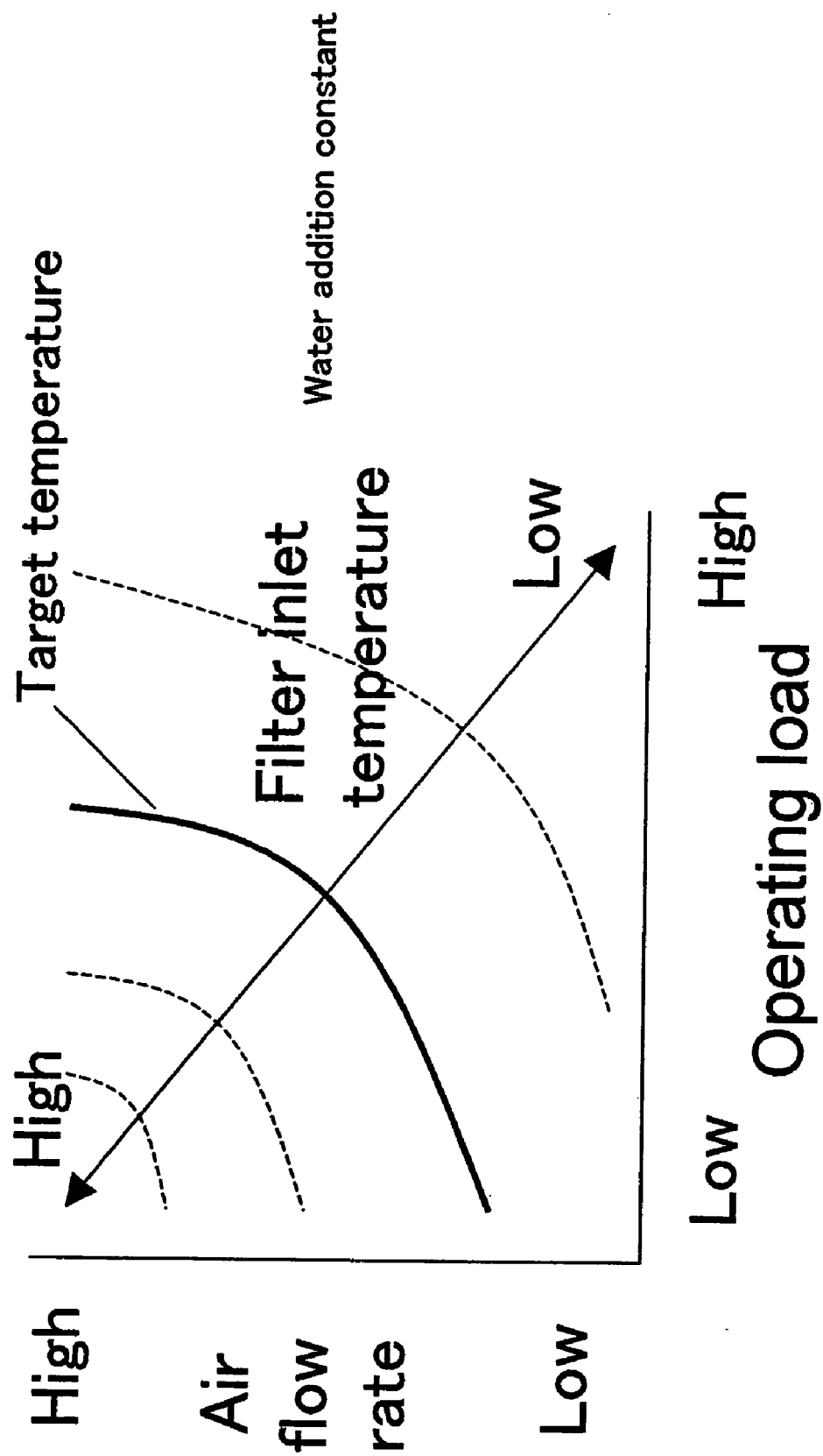
FIG. 8 is a chart showing the optimal operation of a fuel cell processing system in accordance with one embodiment of the present invention.

In one aspect of practicing the invention, FIG. 8 shows how adding water at a constant amount and varying the air flow can change the target temperature to an optimized result. For example, when the operating load on the cell is high, an excess amount of air can be added to the reformate stream which oxidizes gases therein (as shown by formulas 3 and 4) so as to increase the temperature of the gases at the filter inlet. As shown in the embodiment represented by the figures, water inlet 128 or 410 and air inlet 126, 320 or 420 can be used for this function.

The temperature of the gases down stream of the filter can be estimated or monitored, as for example by a temperature sensor such as that shown in FIG. 4 as 470. When the temperature of the gases down stream of the filter is in excess of a predetermined level, water can be introduced after the filter to lower the temperature of the gases exiting the filter and prior to downstream system components such as a WGS reactor. In S6, the temperature outlet gas stream of the filter is estimated or monitored and the necessary amount of water needed to cool the outlet gases determined and supplied. As an example, the necessary water flow rate to lower the temperature prior to the WGS inlet can be calculated from WGS upstream temperature data and flow rate of gas introduced upstream of filter. Water is then sprayed into the gases prior to entering the WGS as necessary.

At S7, the time necessary to oxidize and eliminate the collected soot is monitored. The time can be measured empirically by testing before operation of the fuel processing system. If the time has not elapsed, the process continues at S5. When the time has elapsed, water and, if in operation, air which were introduced to the reformate stream are stopped at S8 and normal operation is resumed S2.

As shown in the embodiment represented by FIG. 1, water inlets 128 and 118 can supply water to regenerate the filter. Air can also be added to the reformate stream by inlet 126 to increase the temperature of the reformate stream entering the filter or in vaporization chamber 124 to aid in the combustion of collected soot on the filter. Additional water or steam can be added after filter 130 from inlet 134 to cool the gases exiting the filter. In an embodiment of practicing the invention, water and air from inlets 126, 128 and 134 are stopped as well any additional water from inlet 118 at S8.

The present invention has been described herein with reference to certain preferred embodiments. However, as all of these obvious various thereon will become apparent to those skilled in the art, the invention is not to be considered as limited thereto.

What is claimed is:

1. A fuel processing system for reforming a hydrocarbon fuel characterized by:
   a first vaporization zone for receiving a hydrocarbon fuel and combining it with air or water;
   a reformer in fluid connection with and down stream of the first vaporization zone, which receives the hydrocarbon fuel combined with either air or water to reform the fuel to a reformate stream, which contains a hydrogen rich atmosphere;
   a second vaporization zone in fluid connection with the reformer which is capable of receiving the reformate stream from the reformer;
   a water inlet connected to the second vaporization zone capable of introducing water to the reformate stream; and
   a filter in fluid connection with and down stream of the second vaporization zone, which is capable of preventing a substantial portion of any soot contained in the reformate stream from passing therethrough, wherein the system is adapted to introduce water and air to the second vaporization zone to oxidize any soot collected on the filter in the hydrogen atmosphere of the reformate stream by reactions of the following formulas (1) and/or (2):

$$C + H_2O \rightarrow H_2 + CO \quad (1)$$

$$C + 2H_2O \rightarrow 2H_2 + CO_2. \quad (2)$$

2. The fuel processing system of claim 1 further characterized by having an oxidizing catalyst downstream of the filter to reduce the amount of any oxygen in the reformate stream.

3. The fuel processing system of claim 1 further characterized by being adapted to detect soot accumulated on to the filter.

4. The fuel processing system of claim 3 wherein soot is detected on to the filter by a differential pressure gauge connected to the system for measuring the pressure of the reformate stream before and after the filter.

5. The fuel processing system of claim 3 wherein soot is detected on to the filter by determining the operational history of the reformer.

6. The fuel processing system of claim 1 further characterized by estimating the filter outlet temperature during the oxidation of the soot and controlling the temperature of the filter outlet gas by introducing water to the reformate stream passing through the filter.

7. The fuel processing system of claim 6 wherein the filter outlet temperature is estimated by a temperature sensor connected to the system to detect the temperature of the reformate stream in a third vaporization zone.

8. The fuel processing system of claim 1 further comprising a water gas shift (WGS) reactor down stream of the filter, a heat exchanger down stream of the WSG, and a preferential catalyst down stream of the heat exchanger.

9. A process for removing soot in a reformate stream that has been collected on a filter, the process comprising:
   combining a hydrocarbon fuel with air to form a hydrocarbon fuel-air mixture;
   reforming the mixture to a reformate stream, which contains a hydrogen rich atmosphere;
   passing the reformate stream through a filter to collect any soot in the reformate stream on the filter; and
   when a predetermined amount of soot has collected on the filter, introducing at least water and air to the reformate stream for a set period of time during the reforming of the hydrocarbon fuel in sufficient quantity to oxidize the soot collected on the filter by reactions of the following formulas (1) and/or (2):

$$C + H_2O \rightarrow H_2 + CO \quad (1)$$

$$C + 2H_2O \rightarrow 2H_2 + CO_2. \quad (2)$$

10. The process of claim 9 further comprising introducing water in excess of that needed to reform the fuel to the mixture when oxidizing the soot collected on the filter.

11. The process of claim 9 comprising, after passing the reformate through the filter, passing the reformate stream through an oxidizing catalyst downstream of the filter to reduce the amount of any oxygen in the reformate stream.

12. A process for removing soot in a reformate stream that has been collected on a filter, the process comprising:
    combining a hydrocarbon fuel with air to form a hydrocarbon fuel-air mixture;
    reforming the mixture to a reformate stream, which contains a hydrogen rich atmosphere;
    passing the reformate stream through a filter to collect any soot in the reformate stream on the filter;
    when a predetermined amount of soot has collected on the filter, introducing at least water to the reformate stream for a set period of time during the reforming of the hydrocarbon fuel in sufficient quantity to oxidize the soot collected on the filter by reactions of the following formulas (1) and/or (2):

$$C + H_2O \rightarrow H_2 + CO \quad (1)$$

$$C + 2H_2O \rightarrow 2H_2 + CO_2; \text{ and} \quad (2)$$

estimating the amount of soot on the filter by calculating the time lag between forming the mixture and forming sufficient hydrogen in the reformate stream to power a fuel cell.

13. The process of claim 9 comprising estimating the amount of soot on the filter by determining the pressure loss across the filter.

14. The process of claim 9 further comprising determining the temperature of the reformate stream passing through the filter.

15. The process of claim 14 comprising introducing water to the reformate stream down stream of the filter when the temperature of the reformate stream reaches a predetermined value.

* * * * *